July 13, 1954    G. A. LYON    2,683,630
WHEEL COVER
Filed May 7, 1952    2 Sheets-Sheet 2
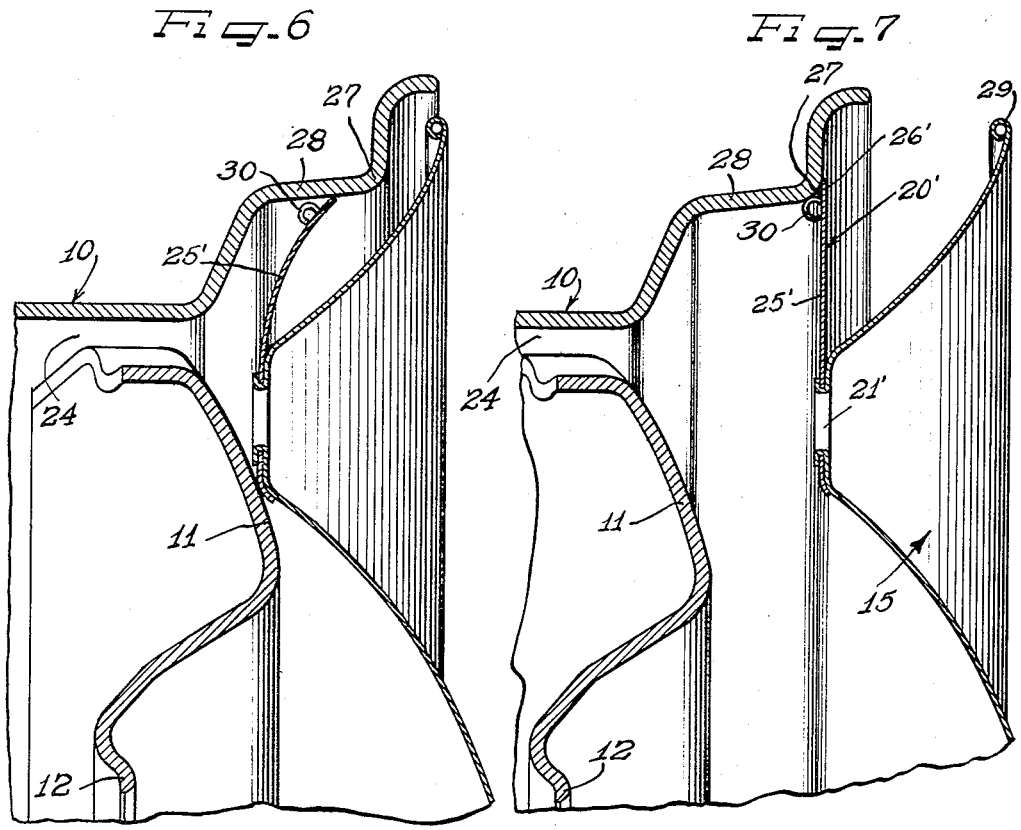
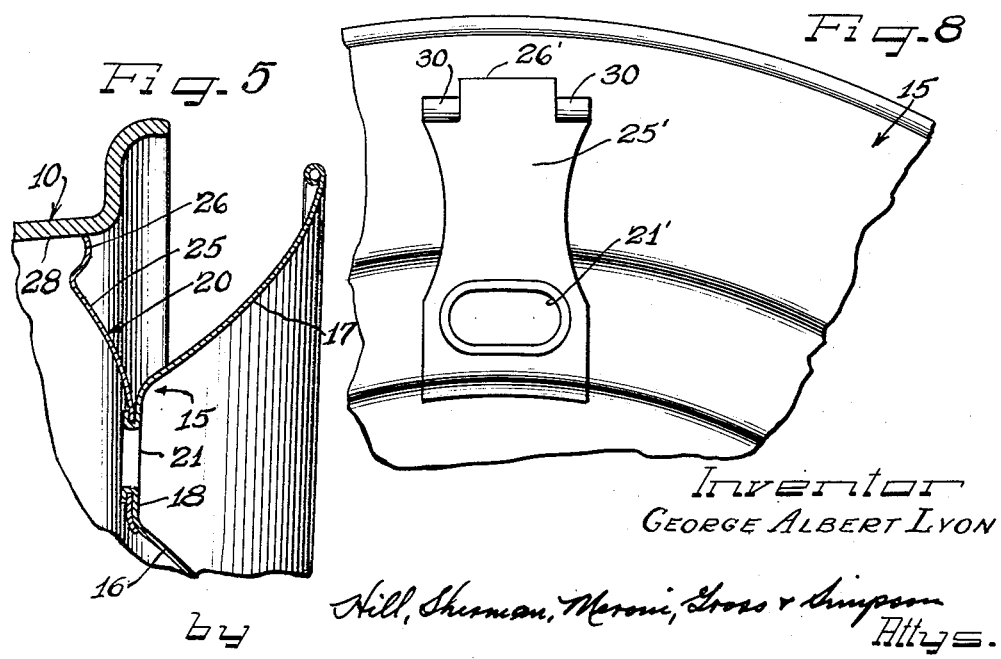
Inventor
GEORGE ALBERT LYON Patented July 13, 1954

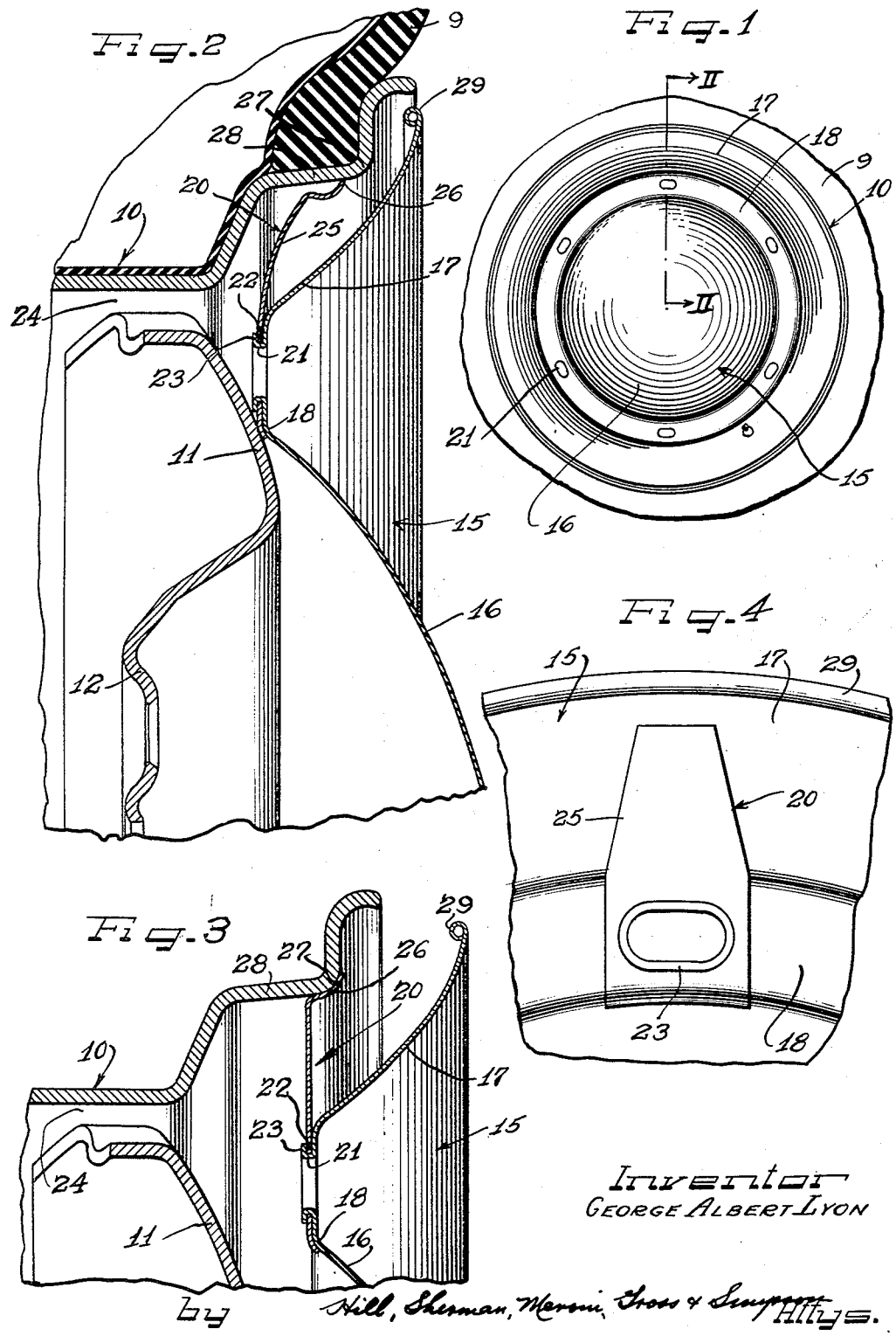

2,683,630

UNITED STATES PATENT OFFICE 2,683,630

WHEEL COVER

George Albert Lyon, Detroit, Mich.

Application May 7, 1952, Serial No. 286,517

2 Claims. (Cl. 301—37)

This invention relates to attaching means for circular objects and more particularly to attaching means especially adapted for securing wheel trim such as a wheel cover to an automobile wheel.

An object of this invention is to provide a simplified form of attaching means for securing a circular member to an annular object and which, in the process of securing the member in place, automatically centers the member relative to the object.

Another object of this invention is to provide wheel cover retaining means of such construction that the means in itself will serve to center the cover on the wheel in the application of the cover to the wheel.

In accordance with the general features of this invention there is provided in a wheel, including a flanged tire rim, a wheel cover for disposition on an outer side of the wheel having resilient retaining fingers on the rear side of the cover, each having a free extremity for retaining engagement with a flange of the rim and formed at said extremity with a shoulder for centering engagement with an edge of said flange prior to and as said finger is pressed against and into retaining engagement therewith.

Another feature of the invention relates to forming the aforesaid retaining finger with a resiliently yieldable body deflectable upon engagement with the rim flange into a bowed shape for enhancing its grip on the rim flange and deflectable into a bowed shape in an opposite direction upon removal of the finger from engagement with the rim flange.

Other objects and features of this invention will more fully appear from the following detailed description taken in connection with the accompanying drawings which illustrate several embodiments thereof and in which:

Figure 1 is a fragmentary side view of a wheel provided with a cover having attaching fingers embodying this invention;

Figure 2 is an enlarged fragmentary cross sectional view taken on substantially the line II—II of the wheel and looking in the direction indicated by the arrows, showing the fingers in retaining engagement with the rim flange;

Figure 3 is a fragmentary sectional view similar to Figure 2 but showing the cover in the process of being applied to the wheel and showing how the fingers serve to center the cover on the wheel;

Figure 4 is a fragmentary rear view of my novel cover showing in elevation one of the retaining fingers;

Figure 5 is a fragmentary cross sectional view similar to Figure 2 showing how the finger is bowed in an opposite direction upon a pryoff force being applied to the cover;

Figure 6 is a fragmentary cross sectional view similar to Figure 2 showing a modified form of finger;

Figure 7 is a fragmentary cross sectional view similar to Figure 6 showing the position of the finger as the cover is being pushed onto the wheel and illustrating how the finger assists in centering the cover; and Figure 8 is a view similar to Figure 4 showing in elevation the modified form of finger of Figures 6 and 7.

As shown on the drawings:

The reference character 10 designates generally a conventional multi-flange drop-center type of tire rim which carries in the usual way a pneumatic tire and tube assembly 9. The tire rim 10 is supported in the usual way upon a central body member 11 having the customary central bolt-on flange 12 by means of which the wheel may be detachably secured to a part on an axle of an automobile.

Cooperating with an outer side of this conventional wheel is a circular wheel trim or cover embodying the features of this invention and which is designated generally by the reference character 15. This cover may be either in the form of a full disc as shown or, if desired, the central crown portion 16 may be omitted. The cover may be made from any suitable sheet metal and is preferably manufactured as a stamping.

In addition to the central crown portion 16, the cover includes an outer annular portion 17 connected thereto. In fact, the two portions 16 and 17 diverge from a common junction portion 18 to which cover retaining means or fingers 20, embodying the features of this invention, are attached. Since these fingers are all identical in construction, a description for one will suffice for all. Any suitable number of these fingers may be used consistent with proper retention of the cover on the wheel although I have, in Fig. 1, shown the cover as being equipped with six of such fingers.

These fingers 20 may be made from any suitable resilient sheet metal and each has one end secured to the cover portion 18 as by means of an eyelet 21 formed in the cover portion 18. In other words, the finger has a hole 22 through which the eyelet portion 21 of the cover extends and is crimped at 23 to the finger, tightly securing the finger to the back of the cover. While I have shown the eyelet as being integral with the cover, it will, of course, be appreciated that the eyelet need not be integral if it is so desired. However, it should be observed that the eyelet does define an air-circulating hole through which air can circulate so as to flow through the usual wheel openings 24 between the rim 10 and the body 11.

The main body 25 of the spring finger or clip extends radially outwardly and terminates in a free extremity which is shouldered or formed with a lateral depressed portion 26 for nesting over the edge 27 of a flange or shoulder 28 of the tire rim 10 as best shown in Figure 3. In Figure 3 it will be perceived that the body 25 of the finger normally extends substantially radially outwardly from the eyelet 21 so that the depressed free extremity 26 is in a position to engage the shoulder 27 of the rim flange 28 when the cover is initially pressed against the wheel. This results in the shoulder extremities 26 of the fingers serving initially to center the cover on the wheel.

Upon continued pressing of the cover against the wheel, from the position shown in Figure 3, the bodies 25 of the fingers will each be deflected into the rearwardly bowed shape shown in Figure 2, thus enhancing the gripping engagement of the free finger extremities 26 against the rim flange 28.

When it is desired to remove the cover from the wheel and from the position shown in Figure 2, a suitable pryoff tool (not shown) such as the end of a screwdriver can be inserted under the turned outer edge 29 of the cover and, upon the application of a twisting force thereto, the cover can be forcibly ejected from the wheel.

During the process of ejecting the cover from the wheel, the fingers will be deflected or bowed in an opposite direction from that shown in Figure 2 and as shown in Figure 5. In other words, the fingers are snapped inside out so to speak, thereby facilitating the moving of the free gripping extremities 26 off of the surface of the rim flange 28.

In Figures 6, 7 and 8 I have shown a modification wherein the principal difference resides in the shape of the free extremity of the finger 20'. For this reason I have used the same reference numerals as I did in the first form of the invention to designate all other parts of the structure that are common to the two forms of the invention.

The finger 20' is fastened at 21' to the cover 15 in the same manner as in the preferred form. The body 25' of the finger terminates in a free extremity 26' which has its side edges slit or cut out into curved indentations or shoulders 30—30 which serve to center the finger and the cover on the wheel as illustrated in Figure 7 in substantially the same way as is the case with the fingers 20. In other words, as the curved lateral shoulders 30—30 engage the edge 27 of the rim flange 28, they will center the cover 15 on the wheel. Continued inward movement of the cover from the position shown in Figure 7 will result in the deflection of the fingers into the bowed shape shown in Figure 6, which is similar to the action of the bowing of the fingers in Figure 2. In both forms of the invention inward movement of the cover is limited by the cover bottoming against the wheel body 11, leaving the outer edge 29 of the cover spaced from the rim so that a pryoff tool can be inserted therebehind.

The removal of the modified form of cover shown in Figures 6, 7 and 8, from the wheel, is substantially the same as in the preferred form.

It should also be noted that in both forms of the invention the bowed shape of the fingers, when in retaining engagement with the rim flange, is such as to enhance the gripping engagement of the fingers against the surface of the cooperating rim flange. On the other hand, when the finger is snapped to a reverse bowed shape or, in other words, to an opposite side of the point of engagement with the rim flange (Fig. 5), the finger is then in a position to be readily and easily slid off of the surface of the rim flange in the removal of the cover.

I claim as my invention:

1. In a wheel structure including a flanged tire rim, a circular wheel cover in cooperation with an outer side of the wheel having a plurality of concealed resilient fingers extending radially from the cover for engagement with a flange of the rim, each finger having a free extremity for resilient engagement of the rim flange and formed at said extremity with a shoulder for centering engagement with an edge of the rim flange prior to and as the finger is pressed against and into retaining engagement therewith.

2. In a wheel structure including a flanged tire rim, a circular wheel cover in cooperation with an outer side of the wheel having a plurality of concealed resilient fingers extending radially from the cover for engagement with a flange of the rim, each finger having a free extremity for resilient engagement of the rim flange and formed at said extremity with a shoulder for centering engagement with an edge of the rim flange prior to and as the finger is pressed against and into retaining engagement therewith, said finger having a resiliently yieldable body deflectable upon engagement with the rim flange into a bowed shape for enhancing its grip on said rim flange and deflectable into a bowed shape in an opposite direction in the removal of the finger and the cover from the wheel.

References Cited in the file of this patent

UNITED STATES PATENTS

| Number | Name | Date |
|---|---|---|
| 1,878,441 | Green | Sept. 20, 1932 |
| 2,193,104 | Lyon | Mar. 12, 1940 |
| 2,368,248 | Lyon | Jan. 30, 1945 |